United States Patent [19]

Miyashita et al.

[11] 4,005,986
[45] Feb. 1, 1977

[54] DEVICE FOR MAKING HIGH TEMPERATURE REFORMED GAS

[75] Inventors: Tsuneo Miyashita, Kawasaki; Kazuo Sano; Kyoji Sasaguri; Kazuo Ishihara; Shunichi Hironaka, all of Yokohama, Japan

[73] Assignee: Nippon Kokan Kabushiki Kaisha, Tokyo, Japan

[22] Filed: Oct. 31, 1973

[21] Appl. No.: 411,333

[30] Foreign Application Priority Data

Nov. 6, 1972 Japan .......................... 47-111006

[52] U.S. Cl. .................. 23/288 R; 23/260; 23/284; 48/196 A; 48/197 R; 252/373; 259/4 R

[51] Int. Cl.² ...................... B01J 8/02; C01B 2/02

[58] Field of Search .............. 23/288 R, 260, 262, 23/284 US, 281; 48/74, 105, 63 US, 107 US, 196 A, 197 R, 75, 80, 85, 197 US

[56] References Cited

UNITED STATES PATENTS

| | | | |
|---|---|---|---|
| 2,846,296 | 8/1958 | Hasche | 48/196 A |
| 2,850,352 | 9/1958 | Odell | 48/196 A X |
| 2,890,929 | 6/1959 | Rummert | 23/284 X |
| 3,132,156 | 5/1964 | Lemon et al. | 23/284 UX |
| 3,234,295 | 2/1966 | Sprauer | 23/284 X |
| 3,284,169 | 11/1966 | Tominaga et al. | 23/284 |
| 3,536,455 | 10/1970 | Bogdandy et al. | 48/107 X |
| 3,849,075 | 11/1974 | Albright et al. | 23/284 |

*Primary Examiner*—Joseph Scovronek
*Attorney, Agent, or Firm*—Flynn & Frishauf

[57] ABSTRACT

A device for making high temperature reformed gas from coke oven gas and blast furnace gas comprises a continuous heating apparatus for preheating a coke oven gas; and a first system including (a) an intermittent heat exchanger containing therein a packing bed of the heat-accumulator type for preheating a blast furnace gas; (b) a separate cyclone-type gas mixing chamber for mixing the preheated raw gases; and (c) an intermittent reforming furnace containing therein a packing bed of the heat-accumulator type impregnated with a catalyst. A second system comprising counterpart elements (a), (b) and (c) is connected to the apparatus (a) in parallel with the first system so as to be operated alternately with said first system. Bypass valves are preferably provided to feed the blast furnace gas directly to the gas mixing chamber bypassing the intermittent heat exchanger.

9 Claims, 1 Drawing Figure

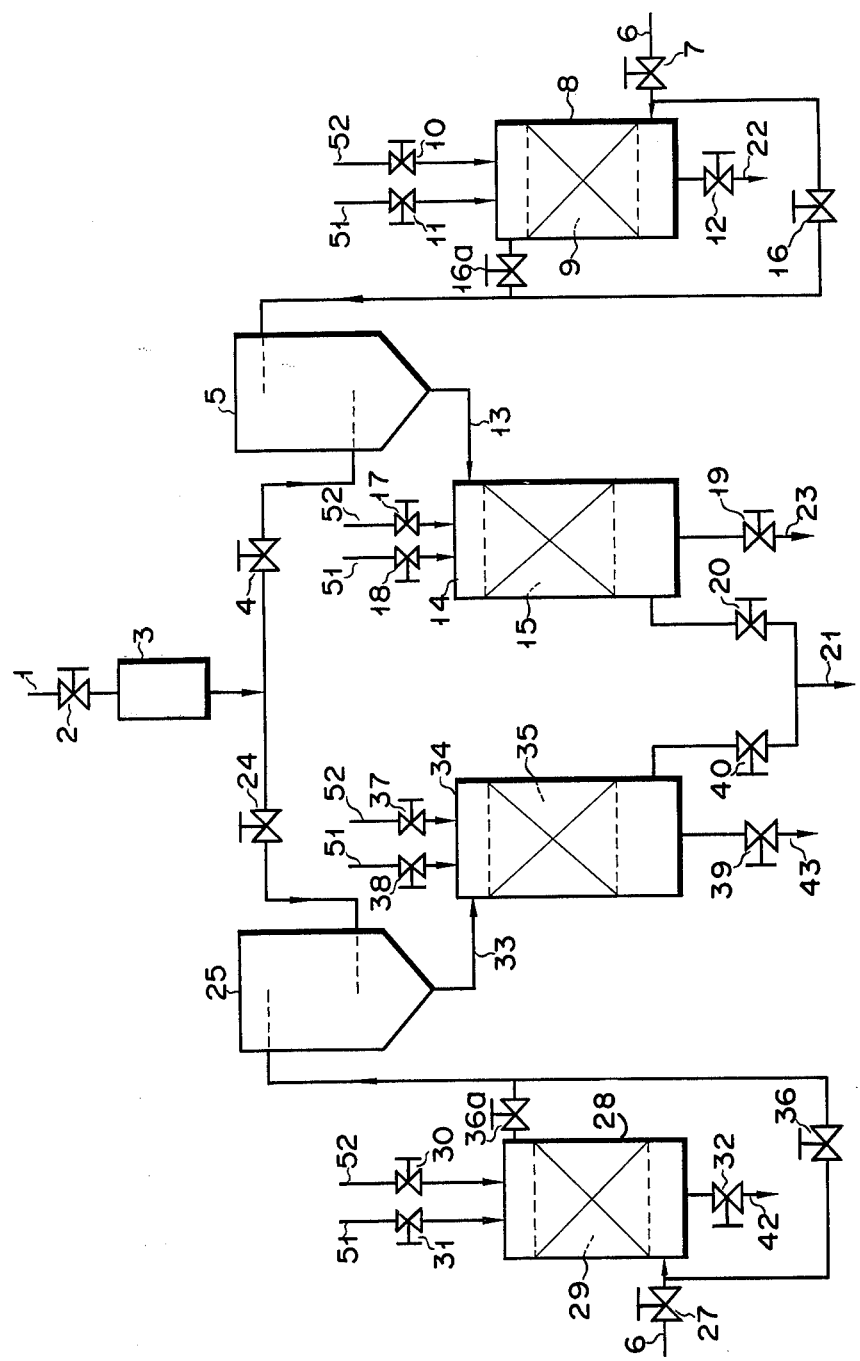

4,005,986

DEVICE FOR MAKING HIGH TEMPERATURE REFORMED GAS

This invention relates to a device for making high temperature reformed gas from a blast furnace gas and a coke oven gas.

Prior art methods for making high temperature reformed gas mainly consisting of hydrogen and carbon monoxide, which comprise catalytically reacting one type of raw gas, for example, a blast furnace gas containing carbon dioxide and carbon monoxide or a petroleum combustion gas essentially consisting of carbon monoxide and water vapor with another type of raw gas, for example, a coke oven gas or natural gas mainly containing methane and hydrogen, are well known. The reformed gas thus obtained has been used as a reducing gas injected into a blast furnace in a heated state, or as a raw material for the synthesis of chemical fertilizer or methyl alcohol in a cooled state.

Among the typical reformed gas making devices, there are that of the Onia-Gegi type (see Thomas E. Dunphy: "ONIA-GEGI Plant in Cork," Inst. Gas Eng. Publication No. 615); that of the Joklik-Kuninger-Otto type (see Schippers, J.: "Otto cyclic reforming plant at the Rotterdam-Feijenood Gasworks," IGU/B. 12-64, The International Gas Conference, Scheveringen, 1964); etc. These known devices, however, were not provided with a separate gas mixing chamber, but simply caused both types of high temperature raw gas to be introduced into a limited space positioned at the top of a reforming furnace. Therefore, the apparatus had a drawback that both raw gases were subjected to channeling in a catalyst bed due to their insufficient mixing, presenting difficulties in reliability when making reformed gas of fixed composition. The prior arrangements were further handicapped by the fact that soot usually grew in the mixed gas flowing through the reforming system, giving rise to various obstructions. The reforming reaction was generally carried out at a lower temperature than 900° C.

It is accordingly an object of this invention to provide a device for making high temperature reformed gas by attaining the complete mixing of blast furnace gas and coke oven gas and raising the temperature of a catalyst bed over the level used in the prior art so as to carry out a full reforming reaction.

Another object of this invention is to prevent the growth of any soot in the gas flowing through a reforming system.

SUMMARY OF THE INVENTION

According to an aspect of the invention, there is provided a device for making high temperature reformed gas which comprises an apparatus for preheating a blast furnace gas to a temperature of 1000° to 1400° C and another apparatus for preheating a coke oven gas to a temperature of 600° to 800° C; a cyclone type separate gas mixing chamber in which both gases are mixed homogeneously; if necessary, an apparatus is provided for raising the temperature of the gas mixture by the combustion heat of additionally introduced petroleum fuel; and a catalyst packing bed at a temperature of 1000° to 1300° C through which the gas mixture is passed.

BRIEF DESCRIPTION OF THE DRAWING

Other important objects and advantageous features of this invention will be apparent from the following description and an appended drawing, wherein a specific embodiment of the invention is set forth in detail. The FIGURE in the drawing is a schematic flow sheet and a set of devices containing a pair of combined systems of the subject reforming device.

DETAILED DESCRIPTION OF THE ILLUSTRATED EMBODIMENT

There will now be described by reference to the appended drawing the operation of the device of this invention for making high temperature reformed gas. Throughout the description, the proportion of gas composition is indicated in percentage by volume.

A coke oven gas 1 having a lower specific gravity than a blast furnace gas is preheated to a temperature of 600° to 800° C in a continuous heating apparatus 3 with the flow rate controlled by a valve 2, and then tangentially introduced into the lower part of a separate cyclone type gas mixing chamber 5 through an opened valve 4, with the corresponding valve 24 closed. The continuous heating apparatus 3 for heating the flowing gas may comprise an ordinary tubular heater or a shell-and-tube heat exchanger.

On the other hand, a blast furnace gas 6 is conducted to the lower part of a heat accumulator type intermittent heat exchanger 8 with the flow rate controlled by a valve 7, to be heated to a temperature of 1000° to 1400° C after passing through the high temperature packing bed 9 previously heated, as later described, by the combustion gas of petroleum fuel. Thereafter the blast furnace gas is drawn out from the top of the heat exchanger 8, and introduced into the upper part of the cyclone-type separate gas mixing chamber 5 tangentially in opposite circulating direction to that of said blast furnace gas introduced. At this time, a value 16a is opened while four valves 10, 11, 12 and 16 are closed. Where the blast furnace gas 6 previously is heated to the desired high temperature, it may be bypassed around heat exchanger 8 through the valve 16 into the gas mixing chamber 5, but not through the valve 16a. The gas mixture 13 drawn out of the mixing chamber 5 enters an intermittent reforming furnace 14 at an upper gas inlet thereof. The reforming furnace 14 contains therein a heat-accumulator type packing bed 15 comprising, for example, of bricks or alumina pebbles, and said bed carries a reforming catalyst. While the gas mixture flows into the reforming furnace 14, three valves 17, 18 and 19 are closed. The catalyst packing bed 15 is preheated to a higher temperature than the gas mixture 13, as later described, by the combustion heat of petroleum fuel. While passing through the catalyst packing bed 15, the gas mixture 13 has its temperature raised by heat exchange to a prescribed range over 1000° C, attaining a rapid reformation reaction and preventing the growth of soot in the furnace 14.

The reforming catalyst used in this invention comprises, for example, copper oxide which is prepared as well known, by calcining an aqueous solution of copper nitrate previously impregnated in the packing carrier 15. The gas mixture at 1000° to 1300° C reformed by passing through the packing bed 15 is drawn out of the reforming furnace 14 at a lower gas outlet, namely through a valve 20, in the form of reformed gas 21. At this time the corresponding valve 40 in the counterpart system is closed.

Heat energy previously accumulated in the packing bed 15 is gradually carried away or consumed not only by the flowing gas mixture 13 but also by the endothermic reforming reaction expressed by the following well known chemical equation.

$$CH_4 + CO_2 = 2H_2 + 2CO - 59.1 \text{ Kcal}$$

Accordingly, the packing bed 15 and in consequence the reformed gas 21 gradually decrease in temperature.

As seen from the appended drawing, the section of the subject reforming apparatus which follows the continuous heating apparatus 3 comprises a pair of parallel arranged systems. Description of the parts of a counterpart system of the above-mentioned system which bear similar reference numerals is omitted for briefness.

When the temperature of the reformed gas 21 falls below, for example, 1000° C, the valves 4, 7 and 20 are closed, and the valves 24, 27 and 40 are opened to switch over the gas flow to the counterpart system, thereby attaining the substantially continuous production of reformed gas 21 by the same operation as described above. During operation of the counterpart system, the valves 10, 11, 17 and 18 are opened to introduce proper amounts of petroleum fuel 51 and air 52 into the intermittent heat exchanger 8 and reforming furnace 14 at the tops thereof. Valves 12 and 19 are also opened to allow flow of the heat exchanger 8 and reforming furnace 14. The packing bed 9 in the intermittent heat exchanger 8 and the catalyst packing bed 15 in the reforming furnace 14 are heated to prescribed temperature levels by passing downward the combustion gas of the petroleum fuel through said heat exchanger 8 and the furnace 14. Where the continuous heating apparatus 3 comprises a shell-and-tube heat exchanger, it is possible to recover part of the heat energy contained in the exhaust gases 22 and 23 by passing them through said continuous heating apparatus 3. As mentioned above, the repeated switchover operation between a pair of parallel arranged systems enables the continuous production of reformed gas having such a high temperature as 1000° to 1300° C.

For the object of this invention, it is important that the proportions of a gas rich in carbon dioxide and a gas rich in methane be as chosen as to cause $CH_4$ and $CO_2$ constituting the gas mixture to have a nearly equal percentage by volume. Depending on the temperature and the composition of both raw gases, the ratio by volume in which there are mixed, for example, a coke oven gas and blast furnace gas may be chosen to fall within the range of 0.48 to 0.63.

To avoid the explosion of high temperature gas at the start or switchover operation of the subject apparatus, it is necessary that mixing be effected by first introducing a blast furnace gas, and then a coke oven gas into the mixing chamber 5, and be brought to an end by first stopping the supply of the coke oven gas, and then that of the blast furnace gas.

The reason why the coke oven gas is not preheated to a higher temperature than 800° C before being conducted into the mixing chamber 5 is that if the gas is heated to a higher temperature than 800° C, soot will grow in the mixing chamber 5 due to thermal decomposition of methane contained therein. Again the reason why the blast furnace gas is preheated to 1000° to 1400° C is that no soot will be produced within this range of temperature, and moreover higher heating will be industrially accompanied with difficulties.

The reforming apparatus of this invention can also adopt the customary practice of supplying small amounts of petroleum fuel and air to the reforming furnace 14 at the top and mixing high temperature gas obtained by the combustion of said fuel with the mixed raw gases for reformation in order to prevent any slight temperature drop of the reformed gas produced in the catalyst packing bed 15 of the reforming furnace 14.

As apparent from the appended drawing, heat exchange in the packing bed 9 of the intermittent heat exchanger 8 is effected by means of counter current. Counter current type heat exchange is carried out efficiently at a relatively uniform rate all over the packing bed 9, because the temperature difference between the bed and gas is relatively equal all over said bed 9. In contrast, heat exchange in the catalyst packing bed 15 of the reforming furnace 14 is effected by means of co-current. In the co-current type heat exchange, the catalyst packing bed 15 and the gas conducted thereto indicate a wider temperature difference at the top of said bed 15 than at the bottom thereof, causing reformation reaction to take place mostly at the top, said reaction being simply finished at the bottom.

The operation of the reforming device of this invention will be more fully understood from the following example, in which there were used raw gases of a coke oven gas and blast furnace gas each having a composition given in Table 1.

Table 1

| Compositions of two raw gases | | | |
|---|---|---|---|
| Coke oven gas (Vol. %) | | Blast furnace gas (Vol. %) | |
| $H_2$ | 51 | $CO_2$ | 12.8 |
| $CH_4$ | 32 | CO | 25.1 |
| CO | 7 | $H_2$ | 4.2 |
| $CO_2$ | 3 | $CH_4$ | 0.8 |
| $C_2H_4$ | 3 | $N_2$ | 57.1 |
| $N_2$ | 3 | | |
| $O_2$ | 1 | | |

Reformed gas was produced from the above raw gases according to the schematic flow sheet appended hereto. The coke oven gas was charged into a tubular heating apparatus 3 at the rate of 300 Nm³ per hour and, after being heated to about 700° C, into a cyclone-type mixing chamber 5 having an inner volume of 0.65 m³. On the other hand, the blast furnace gas was introduced into an intermittent heat exchanger 8 at the rate of 175 m³ per hour and, after being heated to about 1300° C by the brick-type bed contained therein and previously heated to 1400° C, into the cyclone-type gas mixing chamber 5. Both raw gases were brought into the mixing chamber 5 at such heights thereof and in such directions as previously described. The brick-type bed of the intermittent heat exchanger 8 had an apparent volume of 1.5 m³.

The thoroughly mixed gas at a temperature of about 1200° C was drawn into a reforming furnace 14 containing therein a catalyst packing bed comprising alumina pebbles impregnated with copper oxide catalyst and previously heated to about 1500° C, said bed having an apparent volume of 1.65 m³. The temperature of about 1200° C at which the reformed gas 21 was discharged from the reforming furnace 14 gradually decreased, namely, fell to about 1100° C in half an hour. Then the gas flow was switched over to a counterpart reforming system arranged parallel to that already used. This switchover operation was carried out for half an hour continuously producing reformed gas having a higher temperature than 1000° C at the rate of 570 Nm³ per hour. The reformed gas thus obtained had an average composition of 36% CO, 2.5% $CO_2$, 38% $H_2$, 0.5% $CH_4$, 1% $H_2O$ and 22% $N_2$.

By way of comparison, preparation of high temperature reformed gas was carried out under substantially the same conditions as described above, excepting that a separate gas mixing chamber was omitted. This process was accompanied with drawbacks that the $CO_2$ content of the reformed gas rose to 5.5%, and soot grew in at various parts of the gas recycle system to soil the reforming device and give rise to plugging, resulting in the failure to continue the reforming operation for a long period of time.

For further comparison, high temperature reformed gas was produced in substantially the same manner as described above, excepting that there was used a reforming furnace containing a small simple gas mixing chamber in the reforming furnace. According to this process, however, the $CO_2$ content of the reformed gas was still as high as 5.0%, and soot occurred in the catalyst bed, resulting in a prominent pressure drop in said bed and the far shorter life of the reforming catalyst than in the case of this invention.

What we claim is:

1. A device for making high temperature reformed gas mainly comprising hydrogen and carbon monoxide, said device comprising:
   a source of coke oven gas (1);
   a source of blast furnace gas (6);
   a continuous heating apparatus (3) coupled to said coke oven gas source for preheating the coke oven gas (1);
   a first system including:
   a first intermittent heat exchanger (8) coupled to said blast furnace gas source and containing therein a packing bed (9) of the heat-accumulator type for preheating the blast furnace gas (6);
   a first separate cyclone-type gas mixing chamber (5) having a first inlet coupled to the output of said continuous heating apparatus (3) and a second inlet coupled to the output of said first intermittent heat exchanger (8) for mixing the two preheated gases (1 and 6); and
   a first intermittent reforming furnace (14) coupled to the output of said separate cyclone-type gas mixing chamber (5) and containing therein a packing bed (15) of the heat-accumulator type impregnated with a catalyst for a reforming reaction; and
   a second system including a second intermittent heat exchanger (28), a second separate cyclone-type gas mixing chamber (25) and a second intermittent reforming furnace (34) coupled together and to said continuous heating apparatus (3) and blast furnace gas source as the corresponding elements in said first system; and
   first valve means coupling said first and second systems in parallel to said heating apparatus and second valve means coupling said first and second systems in parallel to said blast furnace gas source, and for permitting alternate operation of said first and second systems.

2. A device according to claim 1, wherein at least one of said packing beds of the heat-accumulator type comprises a bed of bricks.

3. A device according to claim 1, wherein at least one of said packing beds of the heat-accumulator type comprises a bed of alumina pebbles.

4. A device according to claim 1, wherein said first and second intermittent heat exchangers (8;28) each have a heating burner fitted to the top thereof to blow combustion gas thereinto.

5. A device according to claim 1, wherein said first and second intermittent reforming furnaces (14;34) each have a heating burner fitted to the top thereof to blow combustion gas thereinto.

6. A device according to claim 1, wherein each of said systems comprise respective bypass means coupled to said blast furnace gas source to selectively bypass said respective intermittent heat exchangers (8;28) and to feed blast furnace gas (6) directly to said inlet of said respective cyclone-type gas mixing chambers (5;25).

7. A device according to claim 6, wherein said bypass means comprises respective bypass valve means (16,16a; 36,36a) coupled to said blast furnace gas source, to said respective intermittent heat exchangers (8;28) and to said respective cyclone-type gas mixing chambers (5;25).

8. A device according to claim 1, wherein said first valve means comprises first and second valves (4;24) selectively coupling the output of said continuous heater (3) to said first and second gas mixing chambers (5;25), respectively; and said second valve means comprises third and fourth valves (7;27) for selectively coupling said blast furnace gas source to said first and second intermittent heat exchangers (8;28), respectively.

9. A device according to claim 8, wherein said heat exchangers (8;28) and reforming furnaces (14;34) comprise means for heating the packing beds thereof when the other of said systems is operated.

* * * * *